United States Patent
Cordery et al.

(10) Patent No.: US 7,587,066 B2
(45) Date of Patent: Sep. 8, 2009

(54) METHOD FOR DETECTING FRAUD IN A VALUE DOCUMENT SUCH AS A CHECK

(75) Inventors: Robert A. Cordery, Danbury, CT (US);
Bertrand Haas, New Haven, CT (US);
Stephen K Decker, Lake Oswego, OR (US); Hongmei Gou, College Park, MD (US)

(73) Assignee: Pitney Bowes Inc., Stamford, CT (US)

( * ) Notice: Subject to any disclaimer, the term of this patent is extended or adjusted under 35 U.S.C. 154(b) by 678 days.

(21) Appl. No.: 11/303,842

(22) Filed: Dec. 15, 2005

(65) Prior Publication Data
US 2007/0143158 A1    Jun. 21, 2007

(51) Int. Cl.
*G06K 9/00*    (2006.01)
*G06F 21/00*    (2006.01)

(52) U.S. Cl. .......................... 382/112; 382/321; 705/51

(58) Field of Classification Search ................ 382/100, 382/103, 106, 155, 112–116, 135–140, 162, 382/172, 173, 202, 181–194, 232, 254, 274, 382/276, 283, 305, 318, 321; 235/379; 705/51; 399/3
See application file for complete search history.

(56) References Cited

U.S. PATENT DOCUMENTS

| | | | | | |
|---|---|---|---|---|---|
| 5,291,243 | A | * | 3/1994 | Heckman et al. | 399/3 |
| 5,668,897 | A | * | 9/1997 | Stolfo | 382/283 |
| 5,748,780 | A | * | 5/1998 | Stolfo | 382/232 |
| 7,080,041 | B2 | * | 7/2006 | Nagel | 705/51 |
| 7,349,566 | B2 | * | 3/2008 | Jones et al. | 382/139 |
| 7,438,219 | B1 | * | 10/2008 | Crews et al. | 235/379 |

* cited by examiner

*Primary Examiner*—Seyed Azarian
(74) *Attorney, Agent, or Firm*—Ronald Reichman; Angelo N. Chaclas (57) ABSTRACT

A method for detecting possible fraud in a document includes receiving an electronic image of the document and extracting data from the image that includes a plurality of printed characters. Next, one or more properties of the characters are measured, the properties are compared to at least one corresponding normative property to determine whether anomalies are present, and a determination is made as to whether to provide a fraud alert based on the anomalies, if any. Preferably, the method includes reporting the one or more anomalies, if any, to a classifier engine, wherein the classifier engine determines whether to provide the alert. Also, methods for determining character spacing ands/or acuity are provided.

5 Claims, 9 Drawing Sheets

METHOD FOR DETECTING FRAUD IN A VALUE DOCUMENT SUCH AS A CHECK

FIELD OF THE INVENTION

The present invention relates to the detection of fraud in documents such as a check or another value document, and in particular to the detection of fraud using characteristics of printed characters appearing on the document.

BACKGROUND OF THE INVENTION

The number of ways in which a document, such as a check or another value document, can be attacked (i.e., fraud can be committed) is limited only by the imagination and skills of the attacker. In the case of checks, the spectrum of attacks generally falls onto three main classes: counterfeiting, tampering, and re-origination. Counterfeiting is the creation of a copy of a valid check, such as by digital or optical means. Tampering is the process of altering an authentic check to change the payee and/or the amount of the check. Re-origination is the creation of a new check from the scanned background of a valid check or from stolen authentic check stock.

A number of different check security features, such as safety paper and background printing, have been developed to combat and prevent these fraudulent activities. These features have been effective due largely to the fact that traditionally, the actual physical presentation of checks to be deposited was necessary because, under prior banking laws, the depository bank had to present the original of each check to the corresponding paying bank in order to clear the check. This changed in October of 2004 with the enactment of The Check Clearing for the $21_{st}$ Century Act, commonly referred to as Check 21. Check 21 removed the legal requirement that an original paper check had to be presented to obtain payment. Instead, banks can now use digital images to transport check data from the bank of first deposit to the paying bank. If the paying bank cannot process a check image, the image can be printed, according to certain specifications, to create what is known as a substitute check, which is the legal equivalent of the original paper check. Without the requirement to preserve and use the original paper check, many of the traditional security features will no longer be effective. Thus, there is a need for a method or methods for detecting indicators of fraud in value documents such as a check using electronic images of the documents so that those documents can be identified for further investigation and scrutiny. Such methods would be particularly helpful at various stages of electronic check processing under Check 21.

SUMMARY OF THE INVENTION

The present invention relates to a method for detecting possible fraud in a document, such as a check or other value document. The method includes receiving an electronic image of the document and extracting data from the electronic image that includes a plurality of printed characters. Next, the method includes measuring one or more properties of the printed characters, comparing the properties to at least one corresponding established normative property, such as is contained in the specification for MICR font, to determine whether one or more anomalies are present, and determining whether to provide an alert of possible fraud based on the anomalies, if any. Preferably, the method includes reporting the one or more anomalies, if any, to a classifier engine, wherein the classifier engine performs the determining step. In one particular embodiment, the method further includes making an adjustment for any rotational skew that is present in the electronic image, such as by rotating the electronic image or compensating for the rotational skew during the measuring step.

The one or more properties that are measured may include one or more of a spacing between one or more of the printed characters, an edge acuity of one or more of the printed characters, a vertical alignment of one or more of the printed characters, a rotational alignment of one or more of the printed characters, an ink density of one or more of the printed characters, and a background reflectance of an area surrounding one or more of the printed characters.

In the case of a check, the method may further include attempting to magnetically read a MICR line of the check. In this instance, the determining step is also based on whether all expected characters of the MICR line are magnetically read. If all expected characters of the MICR line are magnetically read, the method may further include performing a checksum [this is known and is used in current checks] verification on the magnetically read characters, or, alternatively, extracted MICR line data, wherein the determining step is also based on an outcome of the checksum verification. In addition, if all expected characters of the MICR line are magnetically read, the method may also further include comparing selected portions of the magnetically read characters, or, alternatively, the extracted MICR data, to corresponding selected portions of the data, wherein the determining step is also based on this comparison.

The present invention also provides a method of determining the spacing between a first printed character and a second printed character on a document. The method includes receiving an electronic image that includes the first and second printed characters in the form of a grayscale image including a plurality of rows and columns of pixels each having a grayscale value. The method further includes creating a plurality of column sums, wherein each of the column sums is a sum of the grayscale value of each of the pixels in a respective one of the columns. Next, a first leading edge and a first trailing edge of the first printed character and a second leading edge and a second trailing edge of the second printed character are located based on a plurality of the column sums. The spacing between the first and second printed characters is then determined based on the first and second leading edges and the first and second trailing edges. In one particular embodiment, the columns are arranged next to one another in a first direction from a first end to a second end, and the locating step includes determining, moving in the first direction from the first end to the second end, a first location along the first direction where a first one of the column sums first exceeds a threshold value, a second location following the first location where a second one of the column sums first falls back below the threshold value, a third location along the first direction following the second location where a third one of the column sums first again exceeds the threshold value, and a fourth location following the third location where a fourth one of the column sums first falls back below the threshold value. In this case, the step of determining the spacing includes determining the spacing based on the first, second, third and fourth locations. In particular, the step of determining the spacing between the first and second printed characters includes determining a first midpoint between the first and second locations and a second midpoint between the third and fourth locations, wherein the spacing is a distance between the first and second midpoints. Similarly, the step of determining the spacing between the first and second printed characters may include determining a first midpoint between the first leading edge and the first trailing edge and a second midpoint between the second leading edge and the second trailing edge, wherein the spacing is a distance between the first and second midpoints. The present invention further provides a method for determining with sub-pixel accuracy the location and orientation of a leading or trailing edge of a character or other line art feature by first determining the location of a threshold edge at the pixel level using, for example, a threshold method, and then in a second step determining the sub-pixel edge location using the grayscale values of pixels on either side of the threshold edge.

The present invention further provides a method of determining a spacing between a first line and a second line in a document having a first edge and a second edge substantially perpendicular to the first edge, wherein the second line is substantially parallel to the first line. The method includes creating an electronic image of the document using a scanner having an image generating surface having a first axis and a second axis. The first axis is parallel to the line of scanning pixels. The second axis is parallel to the relative velocity of the paper and the scanner pixels. Typically in a commercial scanner the first axis and the second axis are substantially perpendicular. The present invention is not limited to the case where the first axis and the second axis are perpendicular. Specifically, the electronic image is created by scanning the document with the first edge being angled relative to the first axis of the scanner. The image generating surface has a matrix of a plurality of rows and columns of pixels. When the electronic image is generated: (i) the first line and the second line have a first slope relative to the first axis, (ii) the first line covers each of a first plurality of pixels in a first one of the columns by a respective first coverage amount, and (iii) the second line covers each of a second plurality of pixels in a second one of the columns by a respective second coverage amount. The spacing between the first line and the second line is determined based on the slope, a first location in the matrix of one of the first plurality of pixels, and a second location in the matrix of one of the second plurality of pixels. In the preferred embodiment, the respective first coverage amount for the one of the first plurality of pixels is approximately 50%, and the respective second coverage amount for the one of the second plurality of pixels is approximately 50%. Each respective first coverage amount and each respective second coverage amount are preferably determined based upon a corresponding grayscale value in the electronic image.

Also provided is an alternative method of determining a spacing between a first line and a second line in a document having a first edge and a second edge substantially perpendicular to the first edge, wherein the second line is substantially parallel to the first line. The method includes creating an electronic image of the document using a scanner having an image generating surface having a first axis and a second axis. The electronic image is created by scanning the document with the first edge being angled relative to the first axis of the scanner. The image generating surface has a matrix of a plurality of rows and columns of pixels. When the electronic image is generated: (i) the first line and the second line have a first angle relative to the first axis, (ii) the first line covers each of a first plurality of pixels in a first one of the columns by a respective first coverage amount, and (iii) the second line covers each of a second plurality of pixels in a second one of the columns by a respective second coverage amount. The method further includes fitting a first curve for the first line of each respective first coverage amount versus corresponding ones of the first plurality of pixels in the first one of the columns, and fitting a second curve for the second line of each respective second coverage amount versus corresponding ones of the second plurality of pixels in the second one of the columns. The spacing between the first line and the second line is determined based on the angle of the line with respect to the first axis, the first curve and the second curve. Preferably, each respective first coverage amount and each respective second coverage amount is determined based upon a corresponding grayscale value in the electronic image.

Also provided is an alternative method of determining a spacing between a first line segment and a second line segment in a document having a first edge and a second edge substantially perpendicular to the first edge, wherein the second line segment is substantially parallel to the first line segment. The method includes creating an electronic image of the document using a scanner having an image generating surface having a first axis and a second axis. The electronic image is created by scanning the document with the first edge being angled relative to the first axis of the scanner. The image generating surface has a matrix of a plurality of rows and columns of pixels. When the electronic image is generated: (i) the first line segment and the second line segment have a first angle relative to the first axis, (ii) the first line segment covers each of a first plurality of pixels in a first one of the columns by a respective first coverage amount, and (iii) the second line segment covers each of a second plurality of pixels in a second one of the columns by a respective second coverage amount. The method includes determining a scanner dependent curve for coverage amount versus grayscale. The method further includes fitting a portion of the scanner dependent curve to the column of grayscale values for the first line segment of each respective first coverage amount versus corresponding ones of the first plurality of pixels in the first one of the columns, and fitting a portion of the scanner dependent curve to the column of grayscale values for the second line segment of each respective second coverage amount versus corresponding ones of the second plurality of pixels in the second one of the columns. The spacing between the first line segment and the second line segment is determined based on the slope, the first curve and the second curve. Preferably, each respective first coverage amount and each respective second coverage amount is determined based upon a corresponding grayscale value in the electronic image.

Further provided is a method of determining the angle of a line segment that crosses at least partially two adjacent collinear sets, e.g., rows or columns, of scanner pixels where the two collinear sets are separated by a distance $x_s$ equal to the reciprocal of the scanner pitch. The first set of grayscale values of the first collinear set of pixels is fit to a scanner dependent curve of grayscale versus coverage to determine a location $z_1$ where the line segment covers half the area of first set of pixels. Similarly, a second set of grayscale values of the adjacent second collinear set of pixels is fit to the scanner dependent curve to determine a second location $z_2$ where the line segment covers half the area of second set of pixels. The set of grayscale values of the first collinear set of pixels is fit to a scanner dependent curve of grayscale versus coverage to determine the 50% coverage point. The angle is measured as the $\arctan((z_1-z_2)/x_s)$.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DESCRIPTION OF THE PREFERRED EMBODIMENTS

Figure 1:
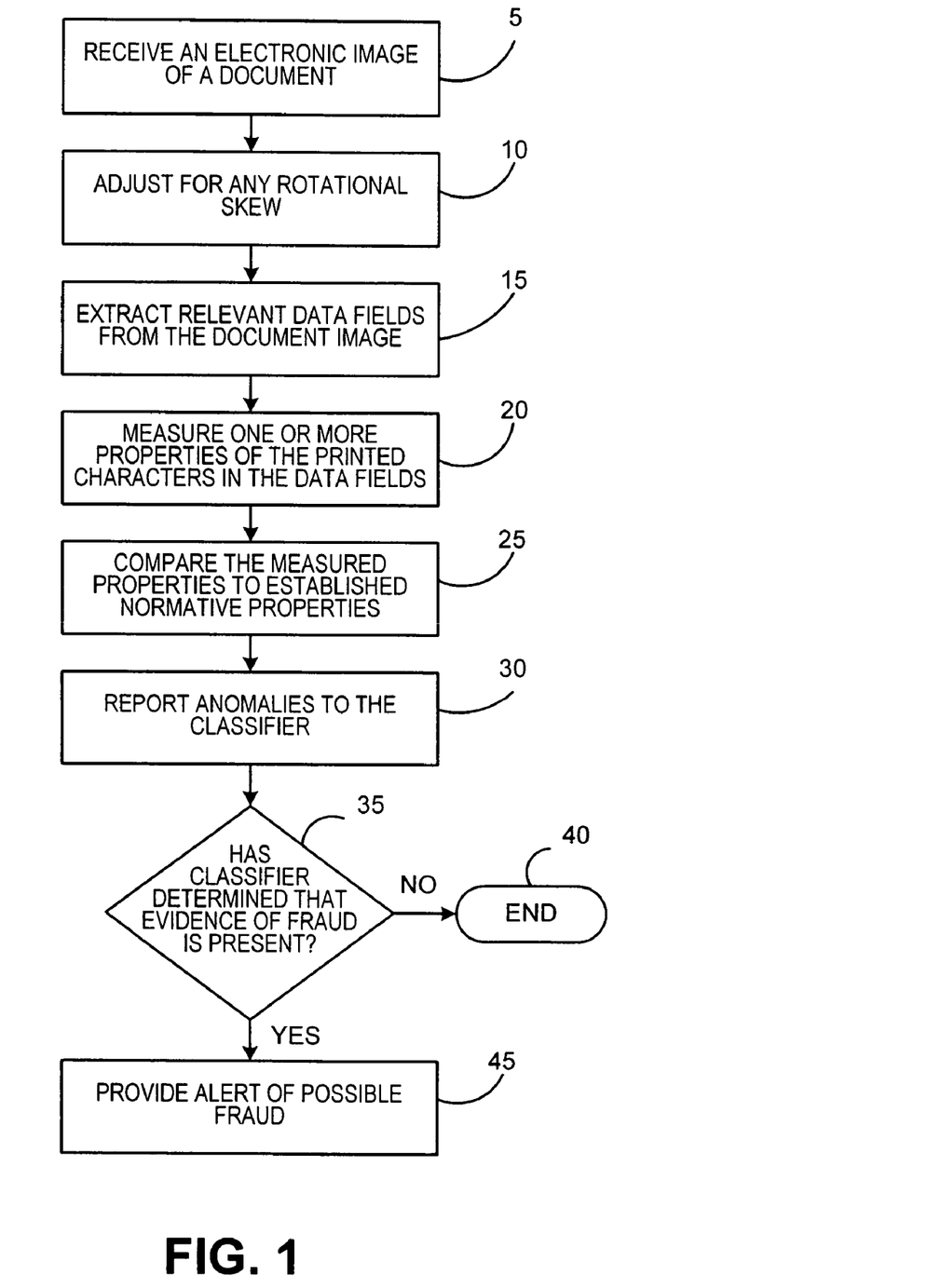
FIG. 1 is a flowchart showing a method of detecting fraud in a document such as a check or other value document using characteristics of machine printed characters appearing on the document according to the present invention.

FIG. 1 is a flowchart showing a method of detecting fraud in a document such as a check or other value document using characteristics of machine printed characters appearing on the document according to the present invention. The method begins at step 5, wherein an electronic image of the document in question is received by a computing device (not shown) such as a PC or the like. Typically, the image will have been created by a digital scanner, such as a known commercially available scanner operating at a resolution of, for example, 200 dpi. As is known in the art, an electronic image of a document, such as a check, may be represented by a grayscale image or bitmap consisting of a number of rows and columns (a matrix) of dots or pixels in a computer memory wherein the brightness of each dot or pixel is expressed as a value representing it's lightness from black to white. Each dot or pixel is mapped to a specific area of the total image, hence the name bitmap. The brightness in a grayscale image is typically defined as a value from 0 to 255 (an 8 bit scale), with 0 being black and 255 being white, or vice versa in some cases. As a result, 256 different shades may be represented.

As is also known, it is often the case that, when an electronic image is created in a scanner, there is some degree of rotational skew in the image resulting from a misaligned feed of the document into the scanner. Thus, at step 10, an adjustment is made to account for any rotational skew in the image. This may be done, for example, in the case of a check by rotating the image to fit it within a rectangular template (i.e., align the edges of the check in the image with the edges of the template). This may also be done by determining the degree of rotation of the image and rotating the image into a proper orientation to compensate therefor using a mathematical method such as a Radon transform. Alternatively, instead of rotating the image to attempt to make it have a proper orientation, the adjustment of step 10 may be accomplished by determining the degree of rotation and making adjustments in the subsequent electronic processing of the image to account for that degree of rotation.

Next, at step 15, the fields of machine printed data that are relevant and of interest are extracted from the image. For example, in the case of a check, those fields of data may be one or more of the courtesy amount printed on the check, the legal amount printed on the check, or the MICR (Magnetic Ink Character Recognition) line printed on the check. Then, at step 20, one or more properties of the printed characters (i.e., letters, numbers, barcodes, symbols or lines) in the extracted data fields are measured electronically. Such properties may be any characteristic relating to the nature or appearance of the printed characters. For example, the properties that are measured may include the spacing between characters, the edge acuity (i.e., sharpness) of the characters, the vertical alignment of the characters, the rotational alignment, e.g., with respect to a horizontal reference, of the characters, the density of the ink of the characters by comparing the gray levels of the printed area in an original check and a copy or a modified version of the original check., and the background reflectance of the area surrounding the characters. As will be appreciated, any variation of these characteristics from what is expected for the document and type or style of machine printing in question will indicate a possibility that the document has been tampered with by changing one or more characters. For example, if a character is removed and replaced by a different character (e.g., a 1 changed to an 8), the spacing and/or alignment of the new character with respect to other characters and/or the edge acuity of the new character may be off (i.e., not consistent with the expected norm). Similarly, the process of removing the original character (i.e., removing the ink) may alter the background reflectance of the paper of the document in the area surrounding the character by making the paper lighter or darker. The background reflectance can be measured by looking at the grayscale values for the area in interest.

At step 25, the one or more measured properties of the printed characters in the data fields are compared to established, normative properties particular to the document and type or style of machine printing in question. For example, the MICR line on checks is printed using ink that can be magnetized, so that it may later be read using a magnetic read head, and using a very tightly specified font called E-13B. The E-13B font consists of ten specially designed numbers (0 through 9) and four special symbols that are aimed at enhancing the machine readability of the characters. Of particular note is the fact that the leading and trailing edges of each MICR character are vertical edges, and the top and bottom edges of each MICR character are horizontal edges. Specifications for other characteristics, such as character spacing, are also provided. Thus, the specifications for MICR printing may be used as a set of established, normative properties in step 25 against which the measured properties of the MICR line characters from the check are compared. In addition, if it is known that other parts of the documents being processed are printed using a particular, specified font, specifications for that font may be used as a set of established, normative properties in step 25 against which the measured properties of the appropriate characters from the check or other document may be compared. As will be appreciated, a number of such specifications or other sets of established, normative properties may be stored in a database and accessed as needed.

Next, at step 30, any anomalies (i.e., deviations form the appropriate established, normative properties) that are detected are reported to a classifier engine. As is known in the art, a classifier engine is a software based tool that is able to accept input data and provide appropriate, specified outputs based thereon. In this case, the classifier engine would take the anomaly information as an input and determine whether an alert of possible fraud in the document in question should be reported. As is also known in the art, the classifier engine can be rules based, probability based, or both. For example, an aspect of the classifier engine may be rules based and may indicate that an alert should be provided if any measured character spacing or acuity varies from the established, normative properties by more than a pre-set threshold amount. Thus, at step 35, a determination is made as to whether the classifier engine has determined that some evidence of possible fraud is present. If the answer is no, then the method ends at step 40. If, however, the answer is yes, then, at step 45, an alert is provided to an operator to indicate that the document being processed warrants further scrutiny.

Figure 2:
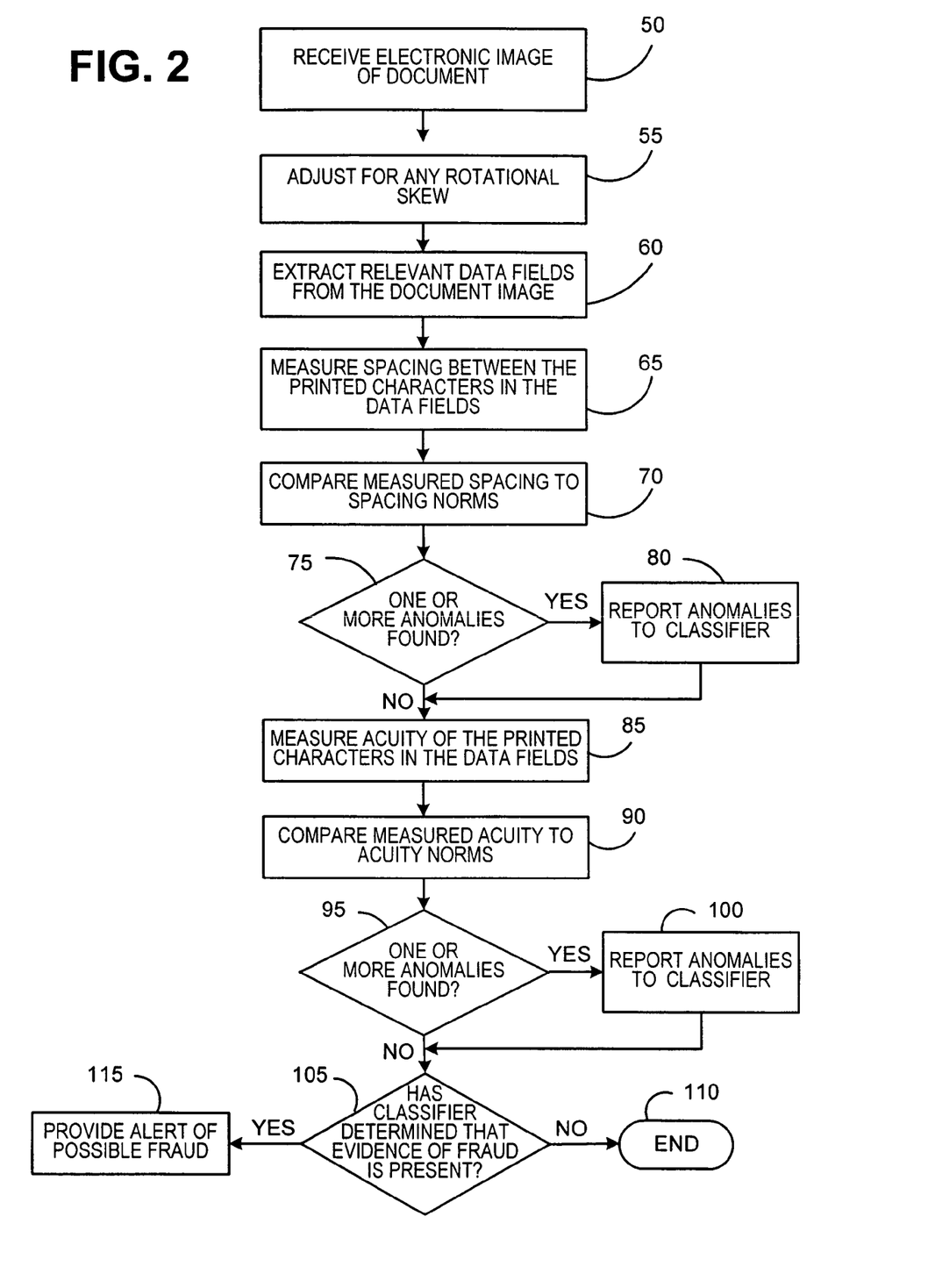
FIG. 2 is a flowchart showing a particular embodiment of the method of detecting fraud in a document such as a check or other value document shown in FIG. 1.

FIG. 2 is a flowchart showing a particular embodiment of the method of detecting fraud in a document such as a check or other value document shown and described in connection with FIG. 1. Specifically, in the embodiment shown in FIG. 2, the particular properties that are measured and used to detect evidence of fraud are the spacing between the printed characters and the acuity of the printed characters. The method begins at step 50, which is identical to step 5 in FIG. 1, wherein an electronic image of the document in question is received by a computing device (not shown) such as a PC or the like. Next, at step 55, which is identical to step 10 in FIG. 1, an adjustment is made to account for any rotational skew in the image. At step 60, which is identical to step 15 in FIG. 1, the fields of machine printed data that are relevant and of interest are extracted from the image. For example, in the case of a check, those fields of data may be one or more of the courtesy amount printed on the check, the legal amount printed on the check, or the MICR line printed on the check.

Then, at step 65, the spacing between the printed characters in the extracted data fields is measured. Two particular methods for measuring character spacing are provided elsewhere herein, although it will be appreciated that any suitable method may be employed. At step 70, the spacing measurements are compared to established, normative properties, as described above, which are particular to the document and type or style of machine printing in question. For example, the MICR specification specifies the spacing that is to exist between each printed MICR character. Next, at step 75, a determination is made as to whether any anomalies (i.e., deviations from the established, normative properties) in character spacing are detected. If the answer is yes, then, at step 80, the detected anomalies are reported to the classifier engine. If the answer is no at step 75, or following step 80, whichever the case may be, the method proceeds to step 85, where the acuity of the printed characters in the extracted data fields is measured. At step 90, the acuity measurements are compared to established, normative properties which, as described above, are particular to the document and type or style of machine printing in question. Next, at step 95, a determination is made as to whether any anomalies (i.e., deviations from the established, normative properties) in character acuity are detected. If the answer is yes, then, at step 100, the detected anomalies are reported to the classifier engine. If the answer is no at step 95, or following step 100, whichever the case may be, the method proceeds to step 105. At step 105, a determination is made as to whether the classifier engine has determined that some evidence of possible fraud is present. If the answer is no, then the method ends at step 110. If, however, the answer is yes, then, at step 115, an alert is provided to an operator to indicate that the document being processed warrants further scrutiny.

Figure 3:
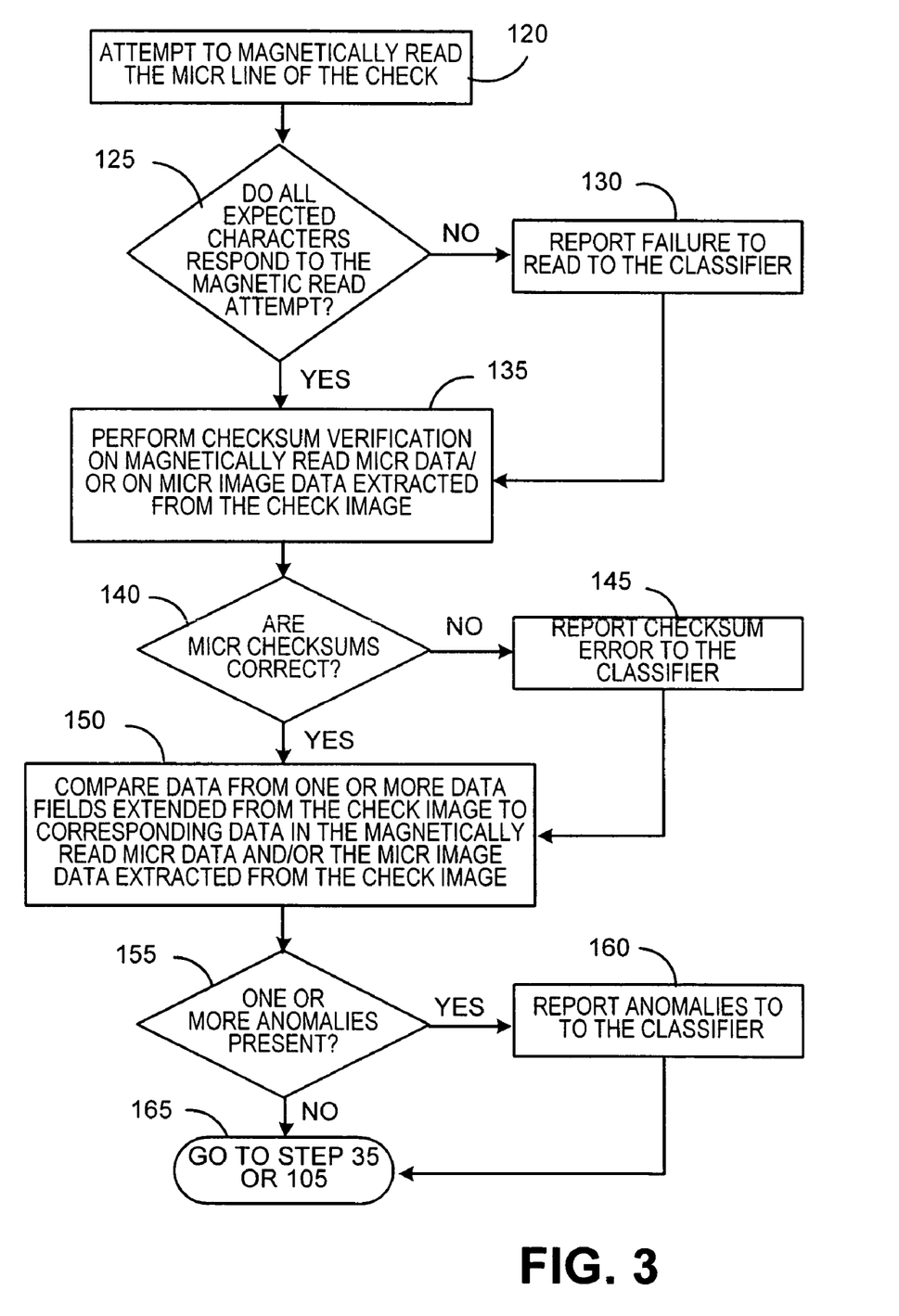
FIG. 3 is a flowchart showing a number of optional, additional steps that may be performed in the method of FIG. 1 or FIG. 2 in the case where the document being processed is a check.

FIG. 3 is a flowchart showing a number of optional, additional steps that may be performed prior to step 35 in FIG. 1 or step 105 in FIG. 2 in the case where the document being processed is a check. In particular, the steps shown in FIG. 3 perform additional analysis on the MICR line information read from the check to determine whether evidence of fraud exists. At step 120, an attempt is made to magnetically read the MICR line of the check using a magnetic read head. At step 125, a determination is made as to whether all of the expected characters have responded to the magnetic read attempt of step 120. As will be appreciated, if the MICR line has been altered by, for example, replacing one or more MICR characters using ink that cannot be magnetized, not all of the characters that will have been expected to have been read will in fact have been read. Thus, if the answer at step 125 is no, then, at step 130, the failure to read one or more characters is reported to the classifier. If the answer at step 125 is yes, meaning all expected MICR characters have been read, or following step 130, whichever the case may be, the method proceeds to step 135.

As is known, all bank routing numbers are generated to according to a particular format that may be checked using what is known as the 3-7-1 formula, which is a form of a checksum for the routing number. In other words, to be a valid routing number, a routing number must be generated and formatted in such a way that it passes the 3-7-1 test, which is performed as follows. First, take the first number in the routing number and multiply it by "3", the next one by "7", and the next one by "1" (then repeat that process for the next 6 numbers, switching between 3, 7, and 1). Then, add up all of the results. If the resulting number can be divided evenly by 10 (with no remainders), then the routing number in question is a validly formatted routing number. Thus, at step 135, a checksum verification as just described is performed using the routing number that appears in either or, preferably, both of the magnetically read MICR data (from step 120) and the MICR image data extracted from the check image (step 15 of FIG. 1 or step 60 of FIG. 2). At step 140, a determination is made as to whether the checksums are correct, i.e., whether the 3-7-1 test has been passed. If the answer at step 140 is no, then, at step 145, the checksum error is reported to the classifier. If the answer at step 140 is yes, or following step 145, whichever the case may be, the method proceeds to step 150.

At step 150, data from one or more of the data fields that has been extracted from the check image (step 15 of FIG. 1 or step 60 of FIG. 2) is compared to corresponding data that appears in either or, preferably, both of the magnetically read MICR data and the MICR image data extracted from the check image. For example, the check number taken from the upper right hand corner of a check may be compared to the check number appearing in the MICR data. Similarly, the legal and or courtesy amount read from the check may be compared to the amount data, if any, appearing in the MICR data. Also, the routing number taken form the MICR data may be used to access a corresponding bank name, such as from a database of routing numbers, and that accessed bank name may be compared to the bank name read from the face of the check. Next, at step 155, a determination is made as to whether data anomalies are present based on the comparisons. If the answer is yes, then, at step 160, the anomalies are reported to the classifier. If the answer at step 155 is no, or following step 160, whichever the case may be, then, at step 165, the method proceeds to step 35 (FIG. 1) or step 105 (FIG. 2), whichever is appropriate, to complete the processing as described herein.

Figure 4:
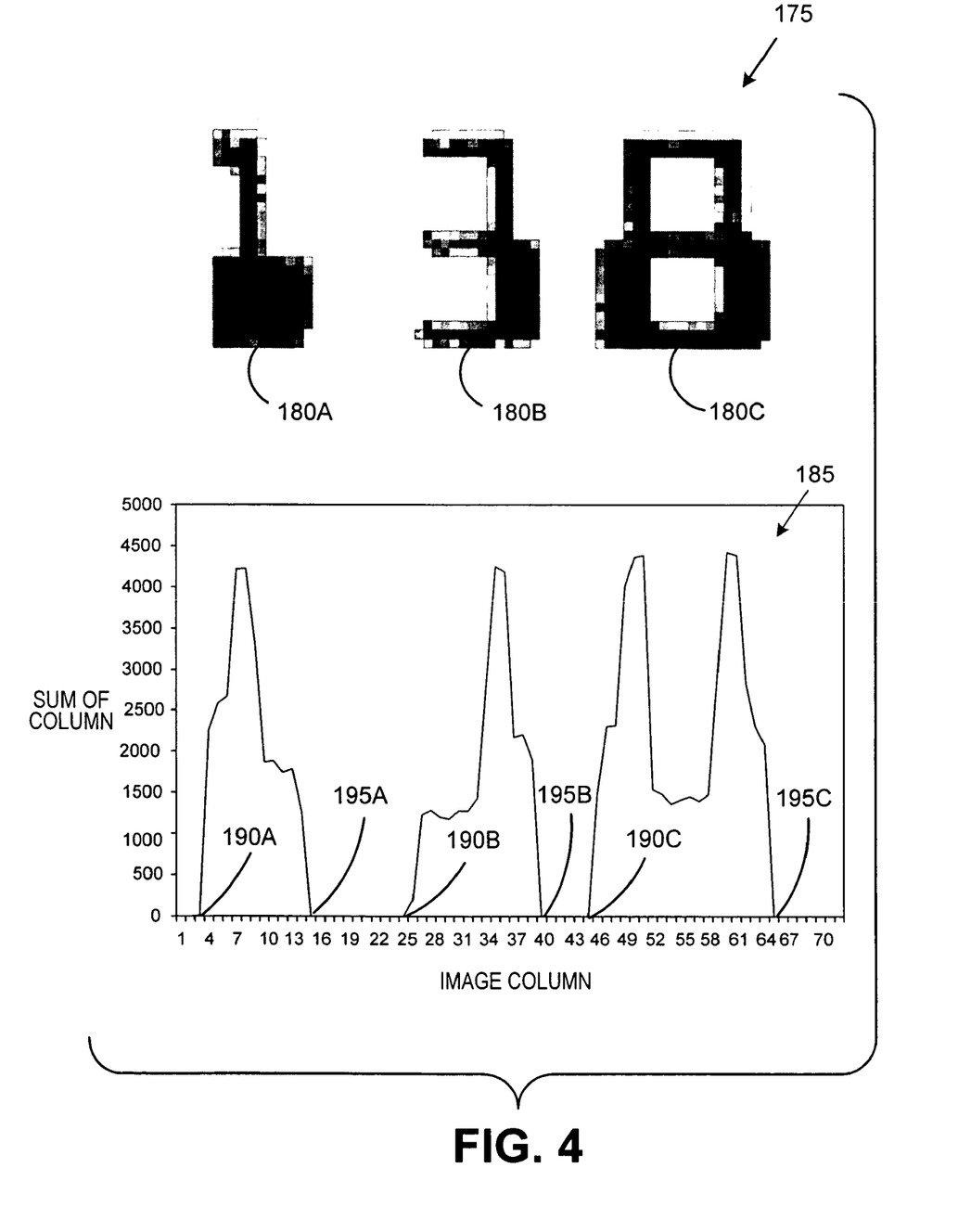
FIG. 4 is a schematic for demonstrating one method in which character spacing and character acuity may be measured according to an aspect of the present invention.

FIG. 4 is a schematic for demonstrating one method in which character spacing and character acuity may be measured according to an aspect of the present invention. A seen in FIG. 4, an image 175 consisting of characters 180A (a "1"), 180B (a "3"), and 180C (an "8") is created from a document, such as a check, that is being processed (see step 5 of FIG. 1 and step 50 of FIG. 2). The image 175 in this example is printed with MICR font, such as may appear on the MICR line of a check. As described above, the image is a grayscale image consisting of a number of rows and columns (a matrix) of dots or pixels in a computer memory wherein the brightness of each dot or pixel is expressed as a value representing it's lightness from black to white. In this case, the brightness is expressed as a value between 0 and 255, with 0 being white and 256 being black. The grayscale value in each column of the matrix is summed and a graph 185 is created wherein the horizontal axis represents each column, and the vertical axis represents the sum of grayscale values in a column. As will be appreciated, with the image 175, the leading edge of each character 180A, 180B, 180C may be detected when the vertical axis value exceeds some lower threshold value close to zero (see points 190A, 190B, and 190C) and the trailing edge of each character 180A, 180B, 180C may be detected when the vertical axis value falls below the lower threshold value (see points 195A, 195B, and 195C). The spacing between each character may thus be measured as the distance between each successive midpoint located between the leading and trailing edge of each character. Alternatively, the spacing between each character may be measured as the distance between each successive leading and trailing edge. The acuity of the characters may be measured by measuring the slope of the lines of graph 185, wherein the greater the slope, the greater the acuity. As will be appreciated, the fact that MICR font is constructed with straight edges and only a few variations between the top and bottom of each character make it well suited for the type of measurement just described.

Figure 5:
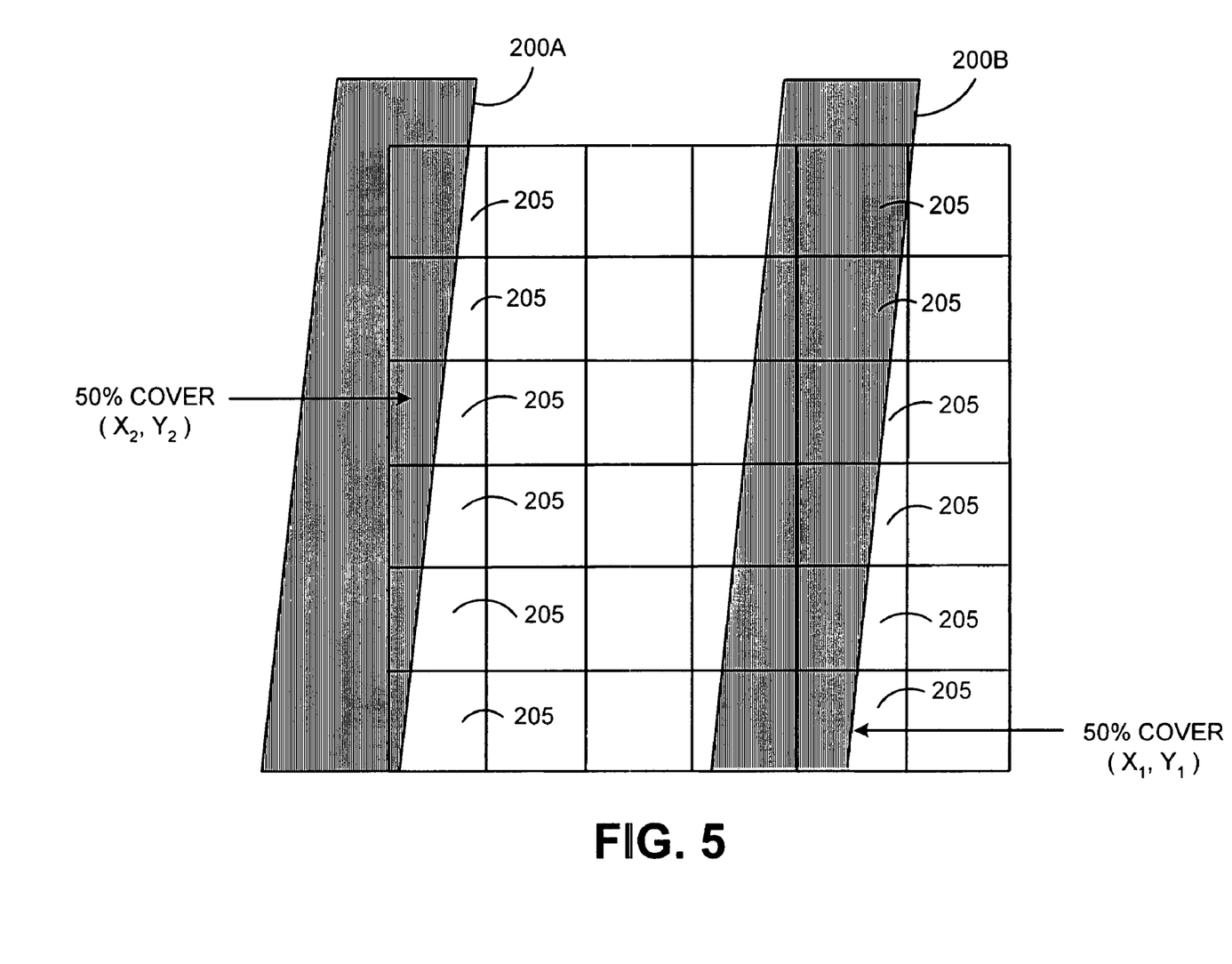
FIG. 5 is a schematic representation showing two substantially parallel lines which are scanned from a document when the document is scanned at a slight angle according to a further aspect of the present invention.

Greater accuracy in determining line and thus character spacing for characters having leading and trailing edges that are substantially straight and parallel to one another (e.g., as is the case with MICR characters) may be achieved according to an alternative embodiment of the present invention in which the scanner and document, such as a check, are provided at an angle to one another during the scanning process. For example, the scanner may be placed at a slight angle, e.g., about 1-2 degrees, to the normal to the edge of the document. As will be appreciated, this will cause different amounts of the lines making up the characters (e.g., the leading and trailing edges) to cover different pixels. FIG. 5 is a schematic representation showing two substantially parallel lines 200A and 200B, each having a slope m equal to 10, which are scanned from a document when the document is scanned at a slight angle described above. In particular, FIG. 5 shows the degree to which each pixel 205 of the scanner is covered by the lines 200A and 200B when the image is generated.

As discussed above, the image may be represented as a matrix of pixels, with each one having a grayscale value. Thus, each pixel 205 may be assigned and X and a Y coordinate. According to the present embodiment, the spacing between the lines 200A and 200B may be determined as follows. First, the pixel 205 that is 50% covered by the line 200B is found (i.e., having a grayscale value of approximately 127.5). That pixel will have coordinates $(X_1, Y_1)$ in the matrix. Then, the pixel 205 that is 50% covered by the line 200A is found. That pixel will have coordinates $(X_2, Y_2)$ in the matrix. In the example shown in FIG. 5, those pixels 205 are identified by the arrows. Next, the degree (i.e., number of pixels) of separation between those pixels 205 on the vertical axis is determined. This value will be $Y_2-Y_1$. In the example shown in FIG. 5, that value is 3. Next, the slope m of the lines 200A and 200B is used to determine a fractional pixel amount. Specifically, the fractional pixel amount is equal to $(Y_2-Y_1)/m$. In the example shown in FIG. 6, the slope m is equal to 10, and thus the fractional pixel amount is equal to $3/10$, or 0.3. Finally, the spacing between the lines 200A and 200B (in the horizontal direction in the matrix) may be determined according to the following formula: $(X_1-X_2)$+0 the fractional pixel amount. In the example shown in FIG. 6, the spacing will be equal to 4.3 (4+0.3).

As an alternative, the accuracy can be increased even further by fitting a curve for each line 200A and 200B of grayscale values versus vertical pixel direction in the matrix. The two curves and the angle m may then be used to determine the spacing.

Figure 6:
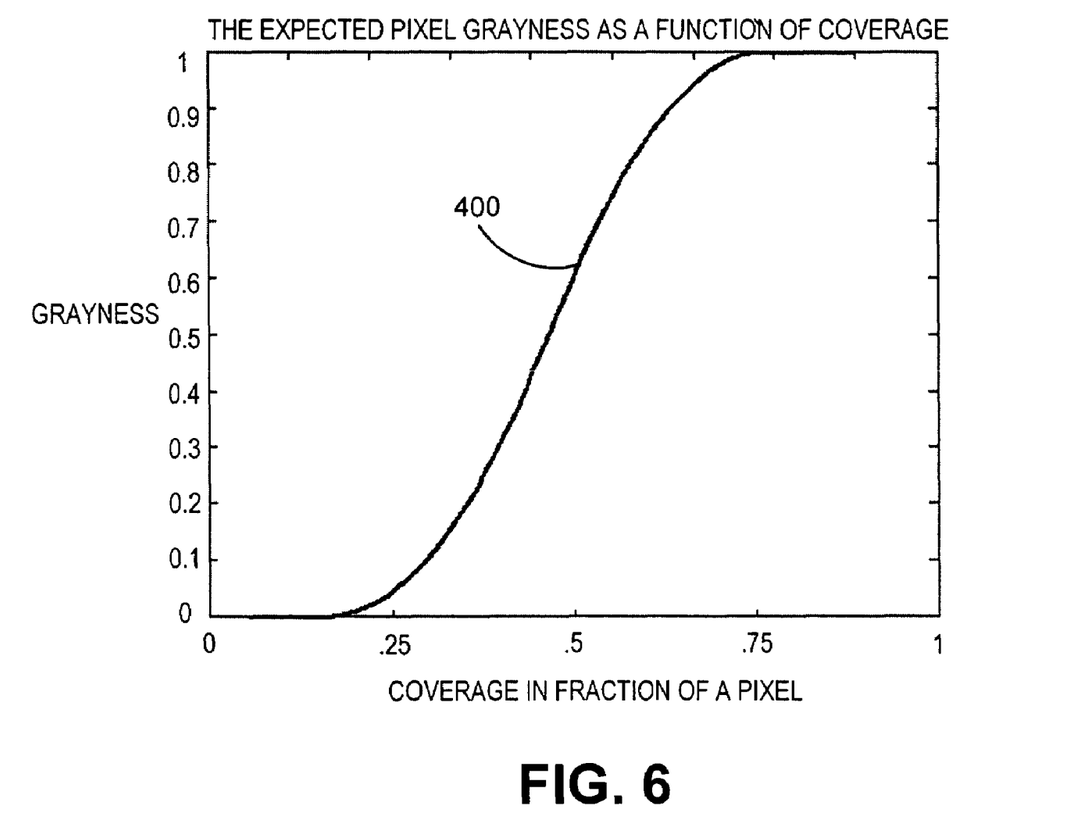
FIG. 6 is a typical graph of the expected grayness of a pixel versus coverage.

FIG. 6 shows the expected grayness versus coverage curve. The scanner, the print technology and the medium all contribute to the curve 400. The curve can be determined for a given printer, scanner and medium by scanning a printed line at a small angle and smoothing the resulting grayness curve 400. This curve can provide a coverage value for particular grayscale value. The grayness curve is shown going from 0 for white to 1 for black. The 8-bit grayscale (GS) of the scanned image is from 0 for black to 255 for white. The actual scan may go from a value averaging $GS_w=180$ for the background to a value averaging $GS_b=40$ within a printed area. These average values depend on the darkness of the background, the darkness of the print, and setting of the scanner. The grayness for a grayscale value of g of a pixel is $(GS_w-g)/(GS_w-GS_b)$. Fluctuations can result in a value below 0 or above 1, so the preferred region to fit the curve is the middle half of the curve from grayness 0.25 to grayness 0.75.

Figure 7:
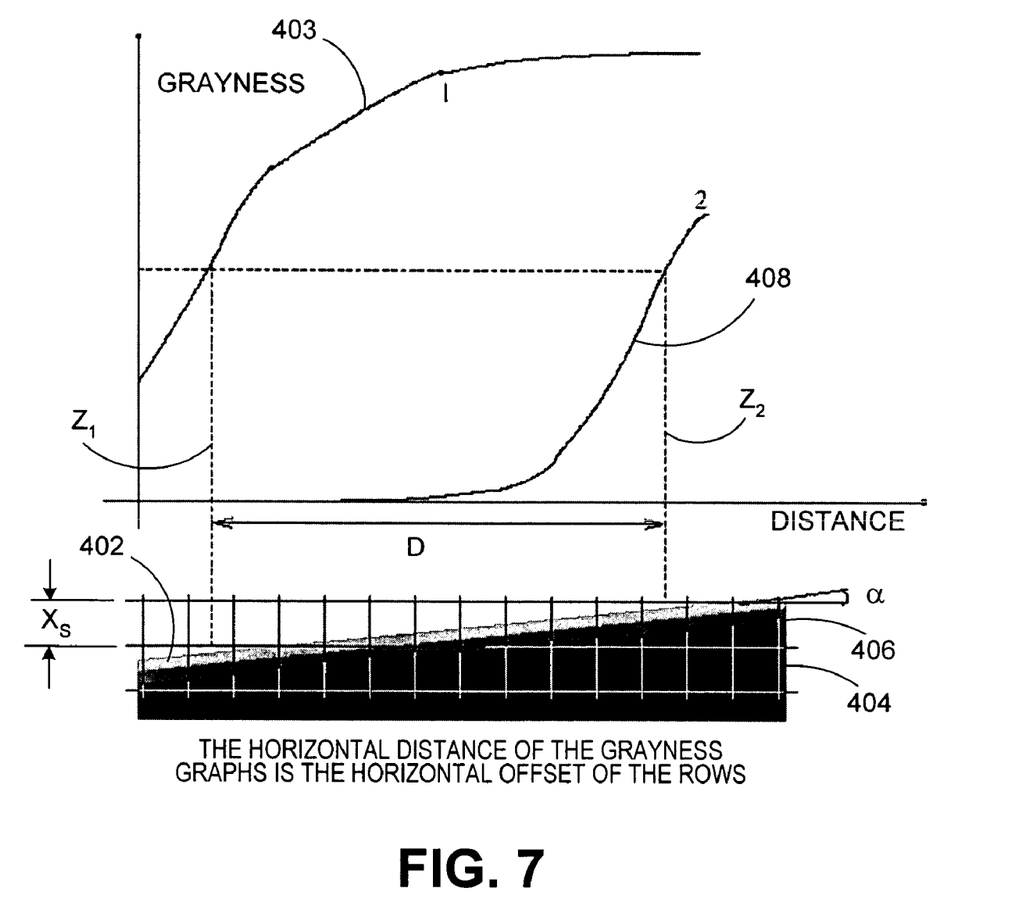
FIG. 7 illustrates a line segment edge intersecting two adjacent rows of pixels.

FIG. 7 shows an edge of a line 402 segment that intersects two rows 404 and 406 of pixels. The line segment is at an angle a to the rows of pixels. The grayness values 403 of the first row of pixels 404 determine a coverage value using the expected grayness versus coverage curve 400 (FIG. 6). A position $z_1$ is determined for the line segment to cover 50% of the first row 404 of pixels. The grayness values 408 of the second row 406 of pixels determine a second coverage value and a second position $z_2$. The spacing between the rows is $x_s$. The angle $\alpha=\arctan(xs/(Z_1-Z_2))$.

Figure 8:
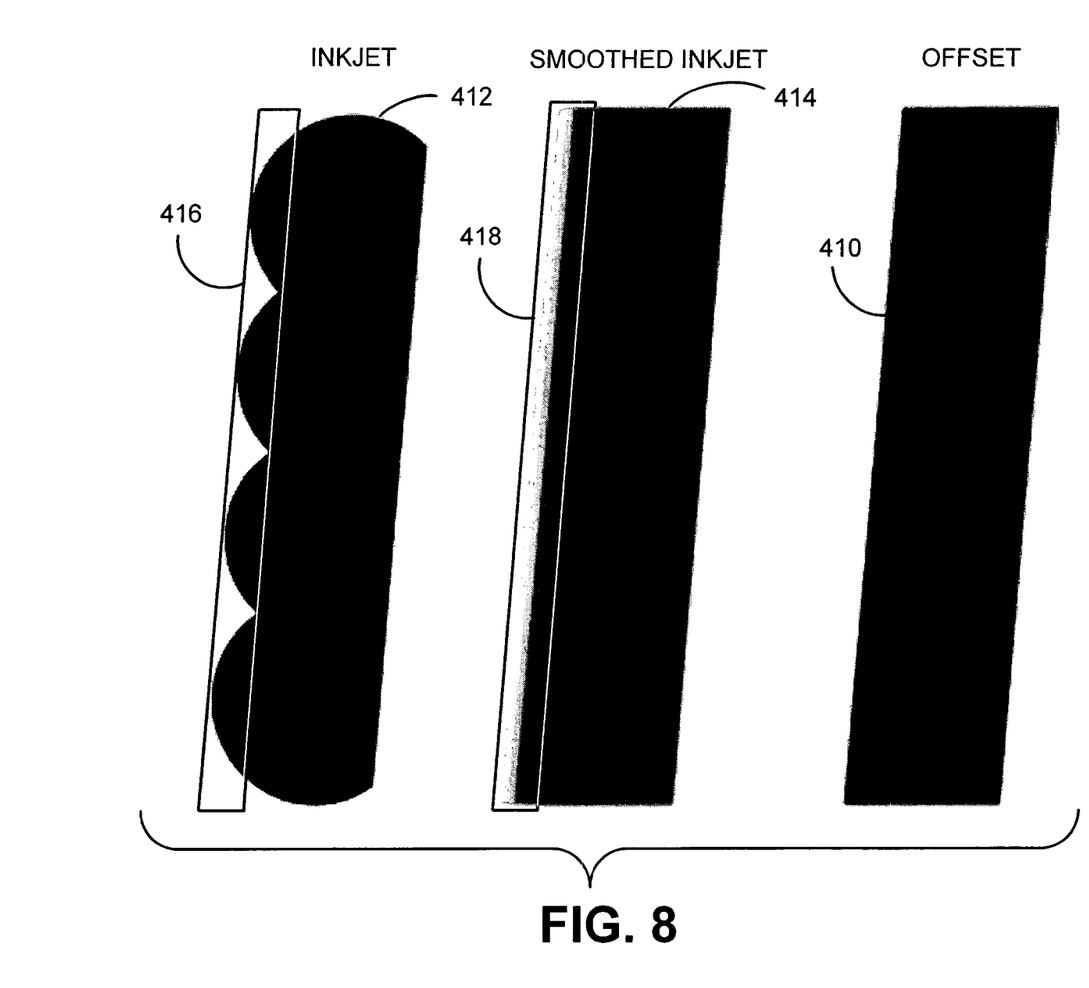
FIG. 8 illustrates a line segment printed with an offset printer, an inkjet printer and the effective smoothing of the edge of that line segment due to the printing technology.

FIG. 8 shows an offset printed line with a sharp edge, an inkjet printed line with substantially circular dots, and a smoothed line 414 that is an average of an inkjet printed line that can be used to calculate an expected coverage curve.

Figure 9:
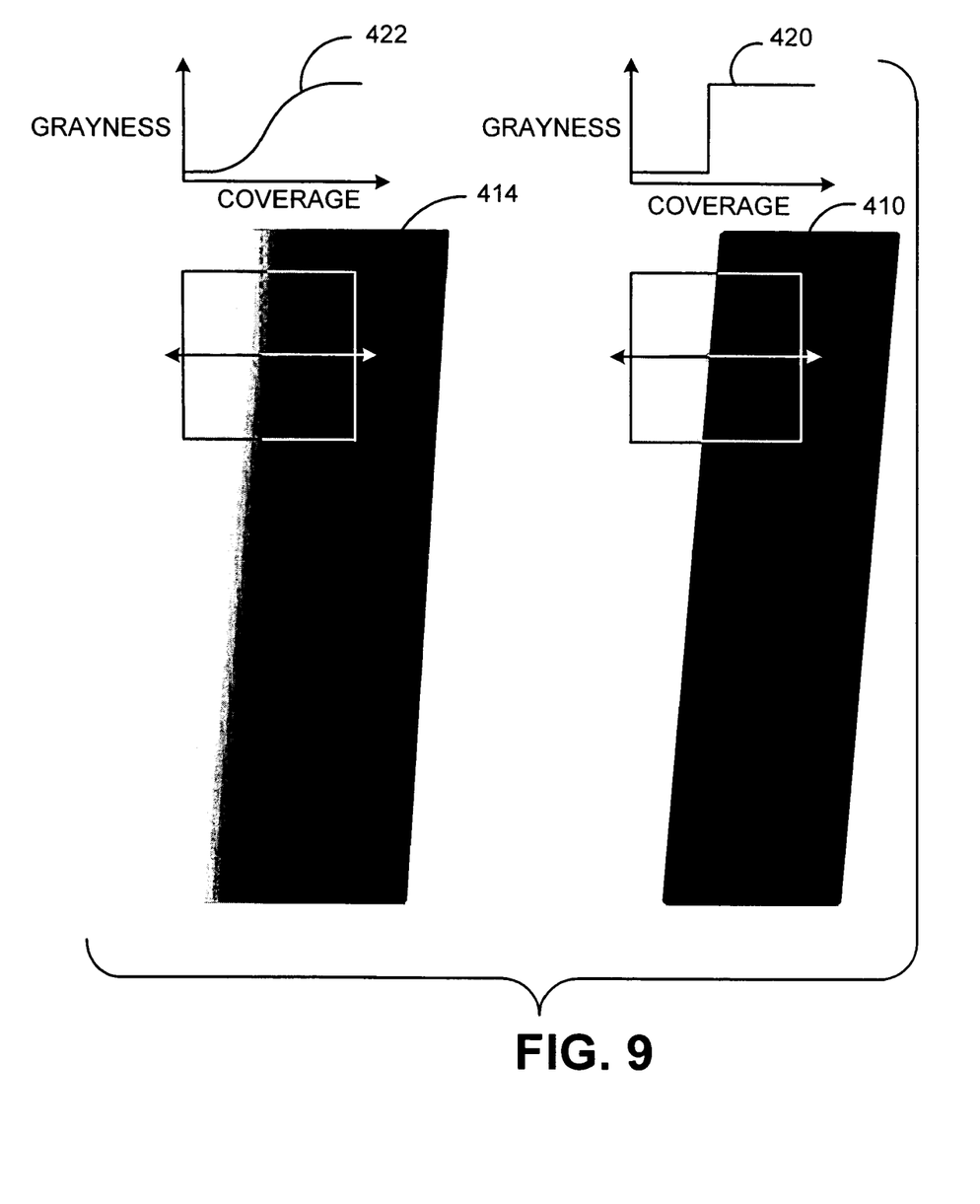
FIG. 9 illustrates the effect of edge sharpness on the grayscale versus coverage for two edges at the same angle where the first edge is sharp such as would be produced by offset printing and the second edge is relatively blurred such as would be produced by inkjet printing.

FIG. 9 shows the expected coverage curve 420 for a scanned image from an offset printed line 410 which makes a transition from white to black, that is, background to printed area that is linear and determined by the scanner pixel size. There is a transition region 316 from white to black for the inkjet printed line and a transition region 418 from white to black for the smoothed ink jet line 414.

The expected coverage curve 422 for a line 414 printed with ink jet or other printing technology that produces slightly blurred or ragged lines tends to be more rounded and makes a slower transition from background to printed area as more of a pixel is covered by the line segment than is the case for an offset printed line segment. Thus measuring the shape and width of the transition of grayscale values gives an indication that a fraudulent check was not printed using offset technology.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method of determining a spacing between a first line and a second line in a document having a first edge and a second edge substantially perpendicular to said first edge, said second line being substantially parallel to said first line, comprising:

creating an electronic image of said document using a scanner having an image generating surface having a first axis and a second axis, wherein said electronic image is created by scanning said document with said first edge being angled relative to said first axis of said scanner, said image generating surface having a matrix of a plurality of rows and columns of pixels, wherein when said electronic image is generated: (i) said first line and said second line have a first slope relative to said first axis, (ii) said first line covers each of a first plurality of pixels in a first one of said columns by a respective first coverage amount, and (iii) said second line covers each of a second plurality of pixels in a second one of said columns by a respective second coverage amount wherein the respective first coverage amount for said one of said first plurality of pixels is approximately 50%, and wherein the respective second coverage amount for said one of said second plurality of pixels is approximately 50% and determining the spacing between said first line and said second line based on said slope, a first location in said matrix of one of said first plurality of pixels, and a second location in said matrix of one of said second plurality of pixels.

2. The method according to claim 1, wherein each respective first coverage amount and each respective second coverage amount is determined based upon a corresponding grayscale value in said electronic image.

3. The method according to claim 1, wherein each respective first coverage amount and each respective second coverage amount is determined based upon a corresponding grayscale value in said electronic image.

4. The method according to claim 3, wherein said first wave is derived from an expected grayness curve for said scanner.

5. The method according to claim 3, wherein said second curve is derived from an expected grayness curve for said scanner.

* * * * *

UNITED STATES PATENT AND TRADEMARK OFFICE
CERTIFICATE OF CORRECTION

PATENT NO. : 7,587,066 B2  Page 1 of 1
APPLICATION NO. : 11/303842
DATED : September 8, 2009
INVENTOR(S) : Cordery et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 936 days.

Signed and Sealed this

Twenty-first Day of September, 2010

David J. Kappos
*Director of the United States Patent and Trademark Office*